(12) United States Patent
Weitzman et al.

(10) Patent No.: US 7,734,621 B2
(45) Date of Patent: Jun. 8, 2010

(54) SEARCHING A DATABASE INCLUDING PRIORITIZING RESULTS BASED ON HISTORICAL DATA

(75) Inventors: Jeffrey Weitzman, Palo Alto, CA (US); Steven R. Boal, Los Altos, CA (US)

(73) Assignee: Coupons.com Incorporated, Mountain View, CA (US)

( * ) Notice: Subject to any disclaimer, the term of this patent is extended or adjusted under 35 U.S.C. 154(b) by 464 days.

(21) Appl. No.: 11/134,048

(22) Filed: May 19, 2005

(65) Prior Publication Data

US 2006/0282410 A1 Dec. 14, 2006

(51) Int. Cl.
*G06F 17/30* (2006.01)
(52) U.S. Cl. .................. 707/720; 707/721; 707/758; 707/999.003; 705/14
(58) Field of Classification Search .............. 707/3, 707/4, 104.1, 720; 705/1, 14
See application file for complete search history.

(56) References Cited

U.S. PATENT DOCUMENTS

| | | | |
|---|---|---|---|
| 4,791,281 A | 12/1988 | Johnsen et al. |
| 4,882,675 A | 11/1989 | Nichtberger et al. |
| 4,896,791 A | 1/1990 | Smith |
| 4,910,672 A | 3/1990 | Off et al. |
| 4,926,255 A | 5/1990 | Von Kohorn |
| 4,949,256 A | 8/1990 | Humble |
| 5,034,807 A | 7/1991 | Von Kohorn |
| 5,056,019 A | 10/1991 | Schultz et al. |
| 5,057,915 A | 10/1991 | Von Kohorn |
| 5,245,533 A | 9/1993 | Marshall |
| 5,283,731 A | 2/1994 | Lalonde et al. |
| 5,283,734 A | 2/1994 | Von Kohorn |
| 5,285,278 A | 2/1994 | Holman |
| 5,287,181 A | 2/1994 | Holman |
| 5,305,195 A | 4/1994 | Murphy |
| 5,305,197 A | 4/1994 | Axler et al. |
| 5,353,218 A | 10/1994 | De Lapa et al. |
| 5,361,871 A | 11/1994 | Gupta |
| 5,368,129 A | 11/1994 | Von Kohorn |
| 5,380,991 A | 1/1995 | Valencia et al. |
| 5,401,946 A | 3/1995 | Weinblatt |
| 5,420,606 A | 5/1995 | Begum |
| 5,459,306 A | 10/1995 | Stein et al. |
| 5,483,049 A | 1/1996 | Schulze, Jr. |
| 5,488,423 A | 1/1996 | Walkingshaw et al. |
| 5,500,681 A | 3/1996 | Jones |

(Continued)

*Primary Examiner*—Apu M Mofiz
*Assistant Examiner*—Monica M Pyo
(74) *Attorney, Agent, or Firm*—Hickman Palermo Truong & Becker LLP

(57) ABSTRACT

Methods and apparatus, including computer program products, are provided that include techniques for searching a database. One method includes receiving one or more input search terms and providing a database. The database maps at least one search term to at least one coupon. The method further includes identifying one or more coupons in the database based on the received input search terms. The method further includes selecting one or more coupons from the identified coupons. A given coupon can be selected based on a number of times the given coupon has been previously printed. A given coupon can also be selected based on a number of times the given coupon has been previously redeemed. The method further includes presenting one or more coupons to the user where the presented one or more coupons include the selected one or more coupons.

22 Claims, 5 Drawing Sheets

U.S. PATENT DOCUMENTS

| | | |
|---|---|---|
| 5,502,636 A | 3/1996 | Clarke |
| 5,504,519 A | 4/1996 | Remillard |
| 5,508,731 A | 4/1996 | Von Kohorn |
| 5,509,070 A | 4/1996 | Schull |
| 5,528,490 A | 6/1996 | Hill |
| 5,557,721 A | 9/1996 | Fite et al. |
| 5,594,910 A | 1/1997 | Filepp |
| 5,604,542 A | 2/1997 | Dedrick |
| 5,612,527 A | 3/1997 | Ovadia |
| 5,636,346 A | 6/1997 | Saxe |
| 5,642,485 A * | 6/1997 | Deaton et al. ............ 705/14 |
| 5,687,322 A | 11/1997 | Deaton et al. |
| 5,697,844 A | 12/1997 | Van Kohorn |
| 5,708,782 A | 1/1998 | Larson et al. |
| 5,710,884 A | 1/1998 | Dedrick |
| 5,710,886 A | 1/1998 | Christensen et al. |
| 5,713,795 A | 2/1998 | Von Kohorn |
| 5,715,314 A | 2/1998 | Payne |
| 5,724,521 A | 3/1998 | Dedrick |
| 5,759,101 A | 6/1998 | Von Kohorn |
| 5,761,648 A | 6/1998 | Golden et al. |
| 5,761,683 A | 6/1998 | Logan et al. |
| 5,774,869 A | 6/1998 | Toader |
| 5,791,991 A | 8/1998 | Small |
| 5,821,512 A | 10/1998 | O'Hagan et al. |
| 5,822,735 A | 10/1998 | De Lapa et al. |
| 5,845,302 A | 12/1998 | Cyman, Jr. |
| 5,855,007 A | 12/1998 | Jovicic |
| 5,884,033 A | 3/1999 | Duvall |
| 5,903,874 A | 5/1999 | Leonard et al. |
| 5,907,830 A | 5/1999 | Engel et al. |
| 5,916,024 A | 6/1999 | Von Kohorn |
| 5,918,211 A | 6/1999 | Sloane |
| 5,918,213 A | 6/1999 | Bernard et al. |
| 5,969,678 A | 10/1999 | Stewart |
| 5,979,757 A | 11/1999 | Tracy et al. |
| 6,002,771 A | 12/1999 | Nielsen |
| 6,006,269 A | 12/1999 | Phaal |
| 6,009,411 A | 12/1999 | Kepecs |
| 6,014,634 A | 1/2000 | Scroggie et al. |
| 6,026,388 A * | 2/2000 | Liddy et al. ............... 707/1 |
| 6,047,310 A | 4/2000 | Kamakura et al. |
| 6,129,276 A | 10/2000 | Jelen et al. |
| 6,134,532 A | 10/2000 | Lazarus et al. |
| 6,185,541 B1 | 2/2001 | Scroggie et al. |
| 6,292,786 B1 | 9/2001 | Deaton et al. |
| 6,298,329 B1 | 10/2001 | Walker et al. |
| 6,298,446 B1 | 10/2001 | Schreiber et al. |
| 6,321,208 B1 | 11/2001 | Barnett et al. |
| 6,332,127 B1 | 12/2001 | Bandera et al. |
| 6,336,099 B1 | 1/2002 | Barnett et al. |
| 6,360,254 B1 | 3/2002 | Linden et al. |
| 6,377,935 B1 | 4/2002 | Deaton et al. |
| 6,377,986 B1 | 4/2002 | Philyaw et al. |
| 6,385,591 B1 | 5/2002 | Mankoff |
| 6,434,530 B1 | 8/2002 | Sloane et al. |
| 6,484,939 B1 | 11/2002 | Blaeuer |
| 6,615,179 B1 | 9/2003 | McNicol et al. |
| 6,638,316 B1 | 10/2003 | Tyler et al. |
| 6,687,346 B1 | 2/2004 | Serbin et al. |
| 7,032,030 B1 | 4/2006 | Codignotto |
| 2002/0194069 A1 * | 12/2002 | Thakur et al. ............ 705/14 |
| 2004/0193487 A1 | 9/2004 | Purcell et al. |
| 2004/0230485 A1 | 11/2004 | Barnett et al. |
| 2005/0149404 A1 | 7/2005 | Barnett et al. |
| 2005/0262005 A1 | 11/2005 | Woolston |
| 2006/0143307 A1 | 6/2006 | Codignotto |

* cited by examiner

SEARCHING A DATABASE INCLUDING PRIORITIZING RESULTS BASED ON HISTORICAL DATA

BACKGROUND

The present invention relates to data processing.

A typical database search engine receives a search query and identifies entries in the database that have some relation to the search query. As the database grows, particular limits exist as to tradeoffs between the amount of time it takes to search the database and the quality of the results returned.

SUMMARY

Methods and apparatus, including computer program products, are provided that include techniques for searching a database. In one aspect, a method is provided that includes receiving one or more input search terms. A database is provided that maps at least one search term to at least one coupon. One or more coupons in the database are identified based on the received input search terms. One or more coupons from the identified coupons are selected. A given coupon can be selected based on a number of times the given coupon has been previously printed. A given coupon can also be selected based on a number of times the given coupon has been previously redeemed. Finally, one or more coupons are presented to the user. The presented one or more coupons include the selected one or more coupons.

Aspects can include one or more of the following features. A given coupon can be selected based on at least one of a number of times the given coupon has been previously printed in response to the input search term, or a number of times the given coupon has been previously redeemed in response to the input search term.

The method can further include determining a category for the input search terms, and identifying one or more coupons in the database based on a search term within the determined category other than the input search terms. The method can further include determining a category for one of the selected one or more coupons and identifying one or more coupons in the database based on a search term within the determined category other than the input search terms.

Selecting one or more coupons from the identified coupons can include selecting one or more coupons based on demographical information of the user. Selecting one or more coupons from the identified coupons can further include selecting one or more coupons based on behavioral information of the user.

The method can further include assigning a priority to each of the identified coupons and presenting the coupons to the user in accordance with the assigned priorities of the coupons. A priority assigned to a given coupon can be based on a number of times the given coupon has been previously printed in response to the input search term. A priority assigned to a given coupon can also be based on a number of times the given coupon has been previously redeemed in response to the input search term.

Presenting coupons to the user can include presenting a reference to a location where the coupons can be printed or redeemed. Presenting coupons to the user can also include printing at least one of the coupons. The presented coupons can include one or more coupons selected at random from the database.

Receiving search terms can include receiving search terms from a user. Receiving search terms can also include deriving search terms from content of a web page.

The invention can be implemented to realize one or more of the following advantages. A term-coupon database is provided that links search terms to coupons that can be redeemed by the end user. The term-coupon database can include information about the number of times a given coupon has been selected, printed, and/or redeemed in the past by other users. The term-coupon database can be searched, and results filtered to allow coupons to be presented to users in accordance with the preferences of the users. The term-coupon database can be updated every time the users select, print, and/or redeem coupons. The term-coupon database can be adapted to the changing preferences of the users. One implementation of the invention provides all of the above advantages.

Details of one or more implementations of the invention are set forth in the accompanying drawings and in the description below. Further features, aspects, and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
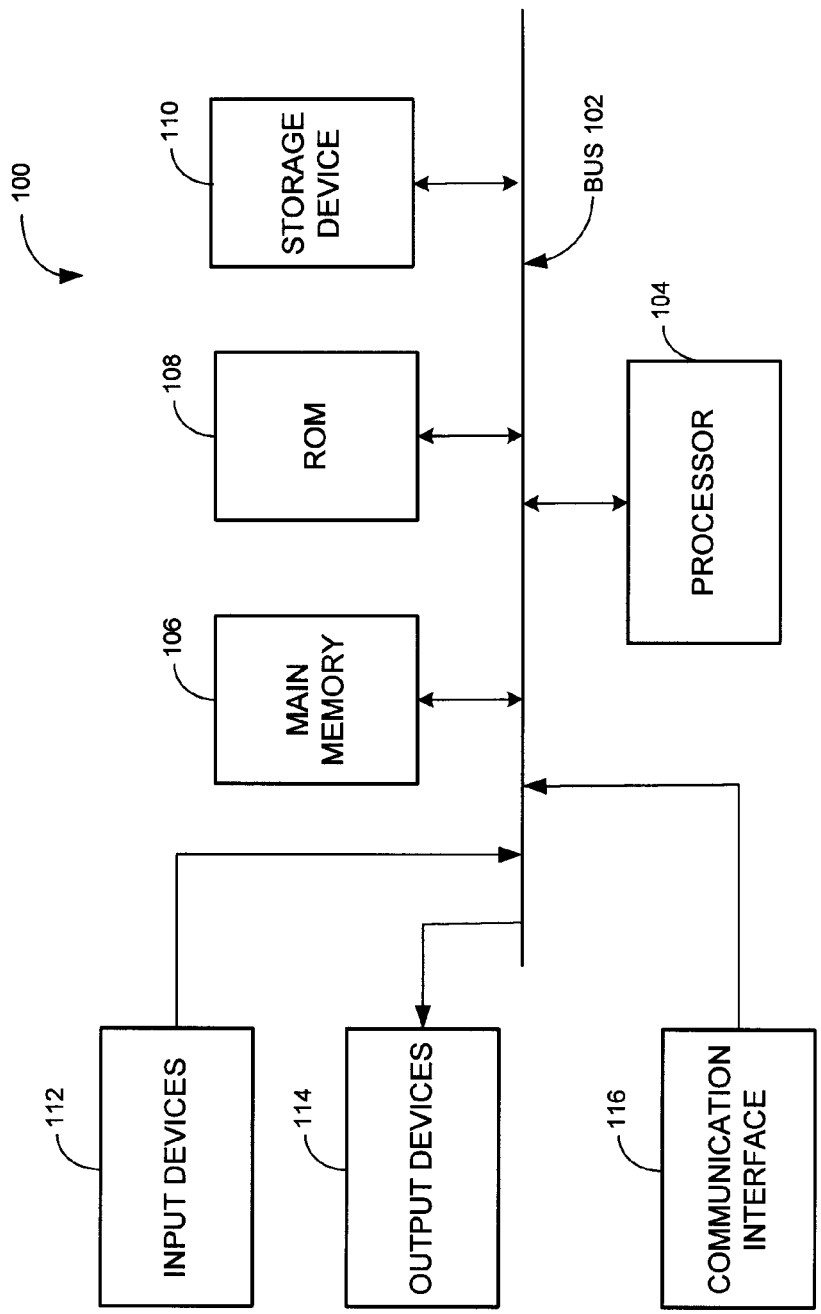
FIG. 1 is a block diagram of a computing system according to one implementation.

Referring to FIG. 1, a computing system 100, in one implementation, can include a bus 102, a processor 104, a main memory 106, a read only memory (ROM) 108, a storage device 110, an input device 112, an output device 114, and a communication interface 116. The computing system 100 can be embodied in, for example, a PDA, a desktop computer, a cellular telephone, and so on.

The bus 102 can include one or more conventional buses that permit communication among the components of the computing system 100. The processor 104 can include any type of conventional processor or microprocessor that interprets and executes instructions. The main memory 106 can include a random access memory (RAM) or another type of dynamic storage device that stores information and instructions for execution by the processor 104. The ROM 108 can include a conventional ROM device or another type of static storage device that stores static information and instructions for use by the processor 104. The storage device 110 can include a magnetic and/or optical recording medium and its corresponding drive.

The input device 112 can include one or more conventional mechanisms that permit a user to input information to the computing system 100, such as a keyboard, a mouse, a pen, voice recognition and/or biometric mechanisms, etc. The output device 114 can include one or more conventional mechanisms that output information to the user, including a display, a printer, a speaker, and so on. The communication interface 116 enables the computing system 100 to communicate with other devices and/or systems. For example, the communication interface 116 can include mechanisms for communicating with another device or system through a network.

As will be described in detail below, the computing system 100, in one implementation, can perform certain searching-related operations. The computing system 100 can perform these operations in response to processor 104 executing software instructions contained in a computer-readable medium, such as memory 106. A computer-readable medium can be defined as one or more memory devices and/or carrier waves. The software instructions can be read into memory 106 from another computer-readable medium, such as the data storage device 110, or from another device through the communication interface 116. The software instructions contained in memory 106 can cause processor 104 to perform search-related activities described below. Alternatively, hardwired circuitry can be used in place of or in combination with software instructions to implement the functionality of the computing system 100. Thus, the computing system 100 is not limited to any specific combination of hardware circuitry and software.

Figure 2:
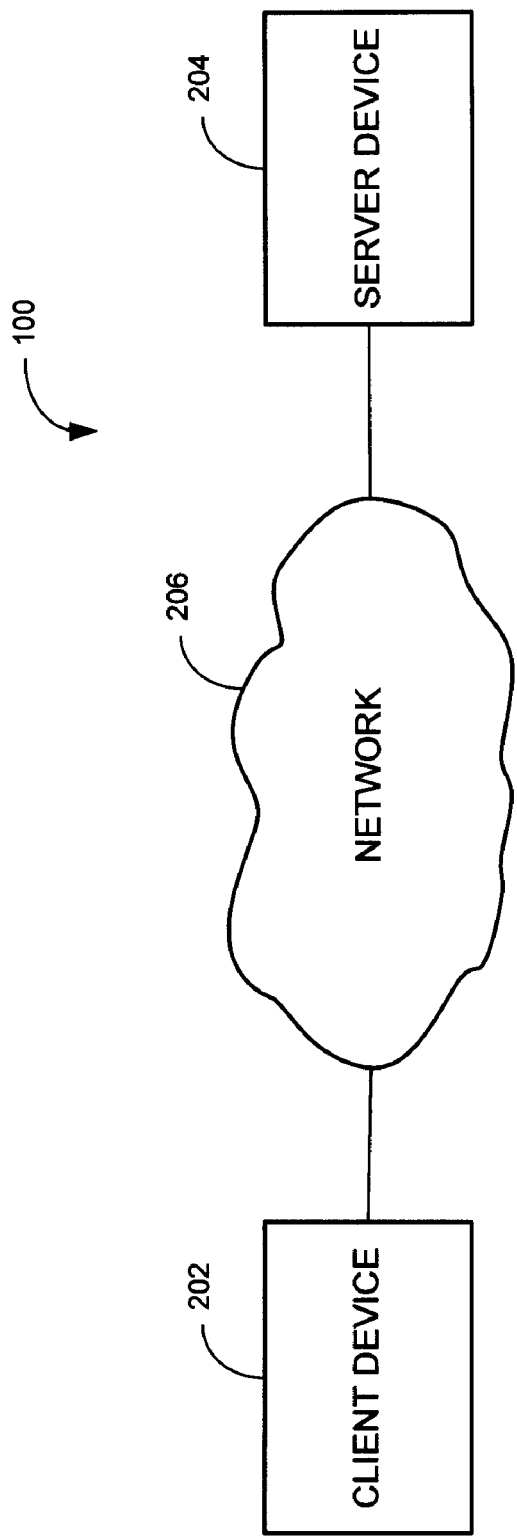
FIG. 2 is a block diagram of a computing system implemented as a client connected to a server through a network.

Referring to FIG. 2, the computing system 100, in one implementation, can be divided between a client device 202 and a server device 204 connected through a network 206. The client device 202 and the server device 204 can be configured in a manner similar to that described above in reference to FIG. 1.

The network 206 can include a local area network (LAN), a wide area network (WAN), a telephone network, such as the Public Switched Telephone Network (PSTN), an intranet, the Internet, or a combination of networks. One client device 202 and one server device 204 are illustrated as connected to the network 206 for simplicity. However, there can be multiple client devices 202 and multiple server devices 204.

In one implementation, the client device 202 can include devices, such mainframes, minicomputers, personal computers, laptops, personal digital assistants, or the like, capable of connecting to the network 206. The client devices 202 can transmit data over the network 206 or receive data from the network 206 through a wired, wireless, or optical connection.

A client device 202, in one implementation, can include a client application that allows a user to enter a search query. A server device 204, in one implementation, can include a server application that receives the user's search query from the client device 202 and searches a database (e.g., a term-coupon database) to identify data (e.g., coupons) that have some relation to the search query. The server application can further filter the identified data (e.g., coupons) to determine which of the identified data are most relevant to the search query and present to the user the filtered data (e.g., only relevant coupons).

Figure 3:
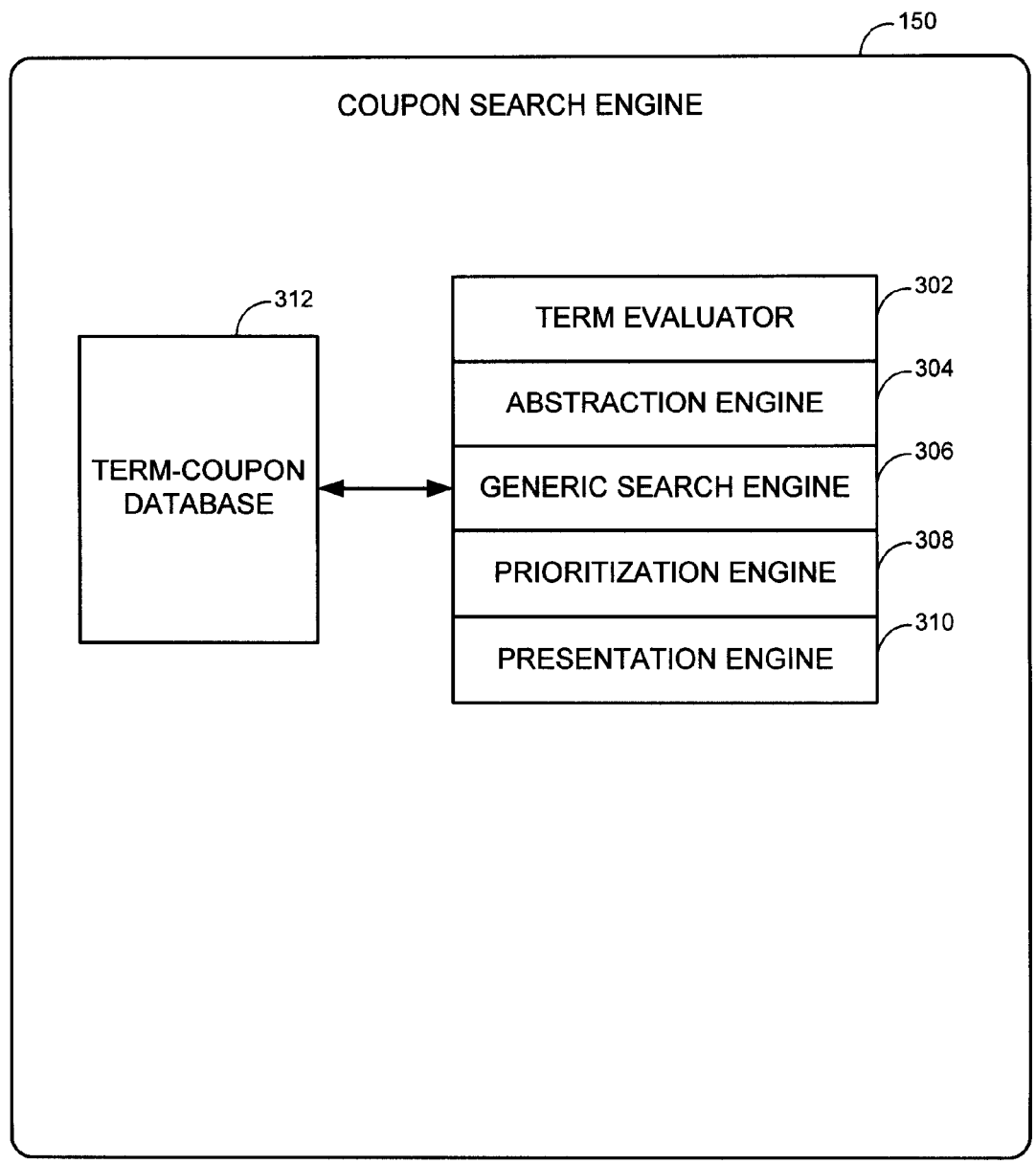
FIG. 3 is a block diagram of a search engine according to one implementation.

Referring to FIG. 3, computing system 100 of FIG. 1 or 2, in one implementation, can include a search engine 150. The search engine 150 can be an application executing on the computing system 100.

In one implementation, the search engine 150 can include multiple components, including a term evaluator 302, an abstraction engine 304, a generic search engine 306, a prioritization engine 308, and a presentation engine 310. The search engine 150 can further include one or more databases (e.g., a term-coupon database) 312 that are either internal or external to search engine 150.

The term evaluator 302, in one implementation, can receive a search query and extract one or more search terms from the search query. The term evaluator 302 can receive a search query in a variety of ways. For example, the search query can be typed by a user in a graphical interface, or provided over a voice interface. The search query can also be derived, e.g., from the content of a web page accessed by the user. For example, if the user opens a web page with an article, the term evaluator can extract terms from the content of the article.

The term evaluator 302 can include a parser and/or a natural language processor to extract search terms from a search query. For example, the term evaluator 302 can extract input search terms "waffles" and "pancakes" from the search query "some kind of waffles or pancakes". The term evaluator 302 can further include a semantic interpreter and extract search terms for the received search query that do not appear verbatim in the received search query. For example, the term evaluator 302 can extract input search terms "low-fat", "low-calorie", "low-sodium", and "breakfast" from the search query "healthy breakfast". Alternatively, the term evaluator 302 can be used to abstract the received search query producing one or more characterizations of the search terms provided. The characterization information can then be used to generate alternative search terms. Further, the term evaluator 302 can modify search terms identified to allow for ease of search. The term evaluator 302 can make use of wild cards and other paradigms to ensure better results.

The abstraction engine 304, in one implementation, can receive search terms (e.g., from the term evaluator 302, or directly from the search user interface) and determine one or more categories for each search term. If the abstraction engine 304 determines a category for one or more search terms that have been provided, the abstraction engine 304 can further identify other search terms within the determined category. For example, the abstraction engine 304 can determine that "breakfast staples" is a category that may be associated with the search term "waffles" and consequently identify other search terms within the "breakfast staples" category, such as "pancakes" and "breakfast meats". The abstraction engine 304 can also be used to abstract at the level of the data returned as a result of the searching performed by the generic search engine 306. For example, once data is located that relates to the particular search terms utilized, the abstraction engine 304 can be used to abstract the returned data (e.g., characterize the returned data) so that other data (e.g., located by using new search terms generated from the characterization) can be presented. Abstraction at the return data level is discussed below.

The generic search engine 306, in one implementation, can receive search terms (e.g., from the term evaluator 302 or from the abstraction engine 304) and use the received search terms to search for and locate data in a database. The generic search engine 306, can use any conventional searching techniques (e.g., string matching) to locate data in the database using the received search terms. Moreover, the generic search engine 306 can search a variety of different kinds of databases. In one implementation, the generic search engine 306 can use the received search terms to search for and locate coupons in a term-coupon database 312.

Figure 5:
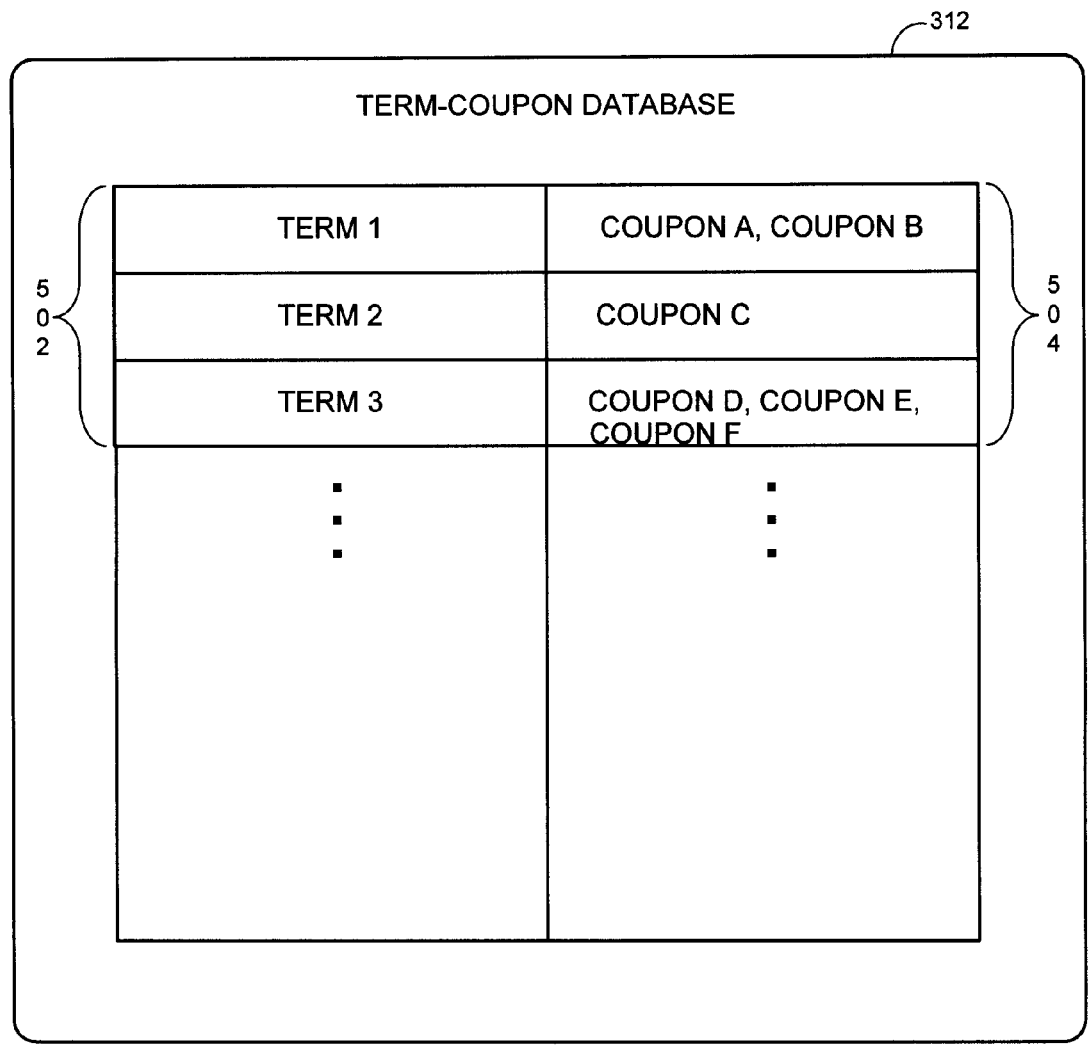
FIG. 5 is a block diagram of a term-coupon database.

Referring to FIG. 5, in one implementation, a term-coupon database 312 is provided and associated with search engine 150 and can include mappings between search terms 502 and coupons 504. Coupons, for example, can include certificates presented at retail in exchange for a discount (e.g., cents-off, percent discount, and so on), cash value, or other benefit, vouchers for a discount or the like. Coupons can also include rebates, tickets, admittance tickets, certificates, gift certificates, promotions or the like. Accordingly, the term-coupon database 312 is not limited to any particular kind of coupons. In one implementation, the term-coupon database 312 can include both terms and coupon identifiers (e.g., a pointer to an actual coupon in another potentially separate database). Other databases may be used by the generic search engine 306 and the prioritization engine 308 as discussed below.

As discussed above, once data is located in the database using the generic search engine 306, the abstraction engine 304 can use the located data to determine a characterization about the located data (e.g., categories for the data) and assist in the further location (e.g., by generating more search terms) of other relevant data in the determined category. Accordingly, instead of, or in addition to determining categories based on search terms, the abstraction engine 304 can determine categories based on identified/located data (e.g., based on located coupons).

The prioritization engine 308, in one implementation, can receive data (e.g., from the generic search engine 306) and prioritize the data. For example, the prioritization engine 308 can assign higher priority to data that is more relevant to the search query and assign lower priority to data that is less relevant to the search query. The prioritization engine 308 can prioritize the data based on one or more prioritization criteria, as will be described later. In one implementation, the prioritization engine 308 can further filter the received data, e.g., by only selecting data with relatively high priority.

The presentation engine 310 can present the resulting data to the user. For example, the presentation engine 310 can provide a user with one or more references to locations where the data can be retrieved. In one implementation, the presentation engine 310 can present the resulting data to the user in accordance with the priorities of the data (e.g., present data in a list, sorted by decreasing priority), using a pass-through device (e.g., a link) to allow for the presentation of multiple located items in a predefined manner. The presentation engine 310 can also present to the user an offer to print a coupon. In one implementation, the presentation engine 310 can present to the user a description of the coupon, and allow the user to print the coupon.

Figure 4:
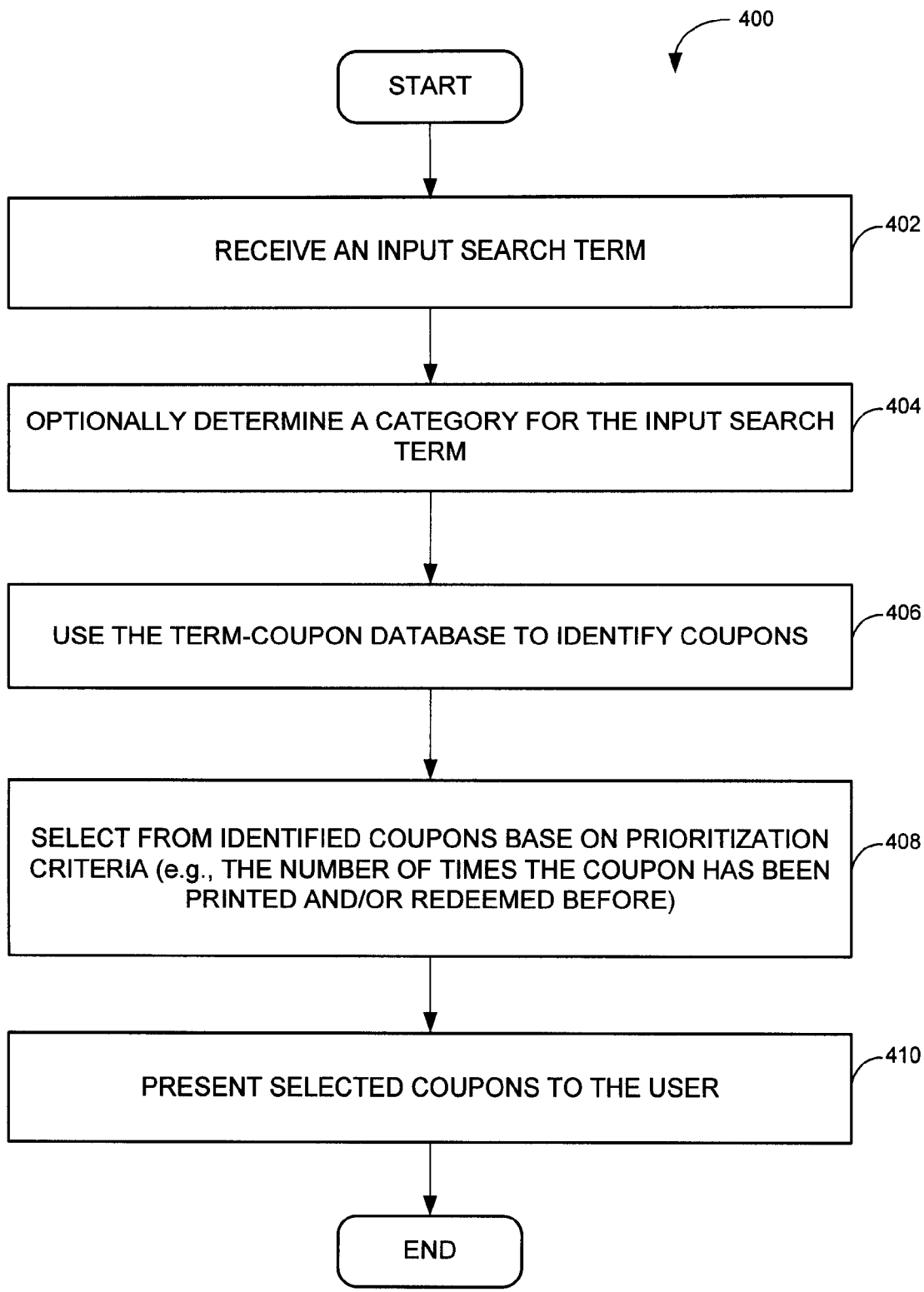
FIG. 4 is a flowchart illustrating a process for searching a database.

Referring to FIGS. 3 and 4, one implementation of a process 400 that the search engine 150 uses to search for data (e.g., coupons) will be described.

User search terms are received, either explicitly or implicitly (step 402). For example, a user can manually enter a search query, including one or more input search terms. Specific search terms can be extracted from the search query. In one implementation, input search terms can be extracted using the term evaluator 302.

Once the input search terms are received, categories optionally can be determined for the input search terms (step 404). In one implementation, categories for the input search terms can be determined by the abstraction engine 304. If categories are determined for the input search term, other search terms in the determined category can be located and used to search for data (e.g., coupons).

Once the appropriate search terms are identified, the search terms can be used to search a database (e.g., using the generic search engine 306). In one implementation, searching the database can include identifying data in the database that is associated with the search terms. In one implementation, a search engine uses the search terms in conjunction with a term-coupon database to identify coupons associated with the search terms (step 406). For example, if the term-coupon database is similar to the term-coupon database 312 discussed in reference to FIG. 5, identifying coupons associated with the search terms can be as simple as identifying all coupons in the term-coupon database 312 that the search terms map to.

Once coupons associated with the search terms are identified, a priority can be assigned to each of the identified coupons (e.g., by the prioritization engine 308) based on one or more prioritization criteria and some of the coupons can be selected (step 408). In one implementation, a higher assigned priority indicates a closer link between the corresponding coupon and the search query.

The identified coupons can be filtered (i.e., only a subset of the identified coupons can be selected) based on the assigned priorities of the identified coupons. In one implementation, only coupons with relatively high assigned priorities are selected.

The assigning of priorities to the identified coupons and, consequently, the filtering of the identified coupons, can be based on a variety of prioritization criteria. Each coupon can be given a score based on criteria. The criteria can be weighted.

In one implementation, a priority can be assigned to an identified coupon based on the number of times that coupon has been printed in the past by users of the search engine. In particular, a priority can be assigned to a coupon that is identified in response to a given input search term based on the number of times that coupon has been printed in the past in response to the same input search term. For example, a lower priority can be assigned to a coupon that has been printed fewer number of times in response to that search term.

Likewise, in one implementation, a priority can be assigned to an identified coupon based on the number of times that coupon has been redeemed in the past by other users of the search engine. In particular, a priority can be assigned to a coupon that is identified in response to a given input search term based on the number of times that coupon has been redeemed in the past in response to the same input search term. For example, a lower priority can be assigned to a coupon that has been redeemed fewer number of times in response to that search term.

Also, in one implementation, a priority can be assigned to an identified coupon based on the number of times that coupon has been selected or viewed in the past by users of the search engine. In particular, a priority can be assigned to a coupon that is identified in response to a given input search term based on the number of times that coupon has been selected or viewed in the past in response to the same input search term. For example, a lower priority can be assigned to a coupon that has been selected fewer number of times in response to that search term.

Other methods for assigning priorities can include methods based on revenue (e.g., to the search engine for redemption), weighting functions (e.g., weighting the provided search terms differently than derived search terms), specific user behavior, group behavior, performance criteria or combinations of these. In one specific implementation, specific user behavior is not considered, and instead, only group behavior is considered when providing filtered results. In one implementation, priorities can depend on the advertisers advertising the coupons (e.g., a higher priority can be assigned to coupons advertised by a particular advertiser). Also, priorities can be assigned to coupons based on the number of coupon prints needed on a campaign or the number of coupon prints remaining on the campaign. In one implementation, the assigning of priorities to the identified coupons can be based on provided demographical information of the user. Likewise, the assigning of priorities to the identified coupons can be based on the behavioral information of the user (e.g., the number of times a particular user printed a given coupon in response to a given input search term in the past).

Once priorities are assigned to the identified coupons (and the identified coupons are filtered) the coupons can be presented to the user, e.g., by the presentation engine 310 (step 410). In one implementation, hyperlinks to web pages where the coupons can be redeemed and printed can be displayed on a computer screen. The coupons may or may not be displayed directly (e.g., only printed)

Statistical information about the number of times a given coupon has been printed, redeemed, and/or selected by users of the search engine 150 can be stored in the term-coupon database 312 or in another database internal or external to search engine 150. As the users of the search engine 150 print, redeem, and/or select coupons, an engine (e.g., the search engine 150) can collect and update the statistical information in the appropriate database (e.g., the term-coupon database 312). As a result, the search engine results can reflect the changing preferences of the users of the search engine 150. A system for collecting print, redemption and selection results in association with electronic coupons is described in co-pending and commonly owned application entitled "Electronic Coupon Distribution System", filed Nov. 30, 1999, and assigned Ser. No. 09/451,160, the contents of which are expressly incorporated herein by reference.

In one implementation, in order to improve the accuracy of the database, a user can sometimes be presented with additional data (e.g., coupons) that were not identified based on the user's search query (i.e., the results identified in step 406 of FIG. 4). For example, additional coupons can be selected at random from the database (e.g., the term-coupon database 312) to check if a user will select, print, and/or redeem a coupon that has not been selected, printed, or redeemed by users of the search engine 150 in the past with respect to this particular search.

The invention has been described in terms of particular embodiments, but other embodiments can be implemented and are within the scope of the following claims.

What is claimed is:

1. A method comprising:
receiving one or more input search terms;
in response to the receiving the one or more input search terms:
retrieving a plurality of coupons from a database based on a search conducted based on the received one or more input search terms, wherein the database maps at least one search term to at least one coupon;
filtering the retrieved plurality of coupons to select which coupons in the plurality of coupons to return as one or more search results for the one or more input search terms, wherein the filtering is based at least partially upon a first criterion, wherein the first criterion is one of:
a number of times a given coupon in the plurality of coupons has been previously both returned as a search result and printed in response to the same one or more input search terms, or
a number of times a given coupon in the plurality of coupons has been previously both returned as a search result and redeemed in response to the same one or more input search terms;
wherein the filtering produces a filtered set of coupons comprising coupons selected as a result of the filtering,
assigning a priority to each coupon in the filtered set of one or more coupons, based at least partially upon one or more of:
a number of times a particular coupon of the filtered set of one or more coupons has been previously printed in response to the same one or more input search terms, or
a number of times a particular coupon of the filtered set of one or more coupons has been previously redeemed in response to the same one or more input search terms; and
returning, as the one or more search results for the one or more input search terms, only the filtered set of one or more coupons;
wherein the filtered set of one or more coupons is returned in a list organized by the assigned priorities of the filtered set of one or more coupons;
wherein the filtered set of one or more coupons that is returned as the one or more search results is smaller than the plurality of coupons retrieved from the database based on the one or more input search terms;
wherein the method is performed by one or more computing devices.

2. The method of claim 1 further comprising:
determining a category for the one or more input search terms; and
identifying at least a particular coupon of the plurality of coupons in the database based on a particular search term within the determined category, wherein the particular search term is a term other than the one or more input search terms.

3. The method of claim 1 further comprising:
determining a category for one of the selected one or more coupons; and
identifying at least a particular coupon of the plurality of coupons in the database based on a particular search term within the determined category, wherein the particular search term is a term other than the one or more input search terms.

4. The method of claim 1, further comprising returning, in response to receiving the one or more input search terms, one or more coupons selected at random from the database.

5. The method of claim 1, wherein returning the filtered set of one or more coupons comprises returning a reference to an online location where the selected one or more coupons can be printed or redeemed.

6. The method of claim 1, wherein returning the filtered set of one or more coupons comprises causing at least one of the selected one or more coupons to be printed.

7. The method of claim 1, wherein receiving the one or more input search terms comprises receiving at least some of the one or more input search terms from a user.

8. The method of claim 1, wherein receiving the one or more input search terms comprises deriving at least some of the one or more input search terms from content of a web page.

9. The method of claim 1, wherein the first criterion is the number of times the given coupon in the plurality of coupons has been previously printed.

10. The method of claim 1, wherein the first criterion is the number of times the given coupon in the plurality of coupons has been previously redeemed.

11. A computer-readable storage medium, comprising instructions which, when executed by one or more computing devices, cause performing:
receiving one or more input search terms;
in response to the receiving the one or more input search terms:
retrieving a plurality of coupons from a database based on a search conducted based on the received one or more input search terms, wherein the database maps at least one search term to at least one coupon;
filtering the retrieved plurality of coupons to select which coupons in the plurality of coupons to return as one or more search results for the one or more input search terms, wherein the filtering is based at least partially upon a first criterion, wherein the first criterion is one of:
 a number of times a given coupon in the plurality of coupons has been previously both returned as a search result and printed in response to the same one or more input search terms, or
 a number of times a given coupon in the plurality of coupons has been previously both returned as a search result and redeemed in response to the same one or more input search terms;
 wherein the filtering produces a filtered set of coupons comprising coupons selected as a result of the filtering,
 assigning a priority to each coupon in the filtered set of one or more coupons, based at least partially upon one or more of:
  a number of times a particular coupon of the filtered set of one or more coupons has been previously printed in response to the same one or more input search terms, or
  a number of times a particular coupon of the filtered set of one or more coupons has been previously redeemed in response to the same one or more input search terms; and
 returning, as the one or more search results for the one or more input search terms, only the filtered set of one or more coupons;
 wherein the filtered set of one or more coupons is returned in a list organized by the assigned priorities of the filtered set of one or more coupons;
 wherein the filtered set of one or more coupons that is returned as the one or more search results is smaller than the plurality of coupons retrieved from the database based on the one or more input search terms.

12. The computer-readable storage medium of claim 11 further comprising instructions which, when executed by the one or more computing devices, further cause performing:
 determining a category for the one or more input search terms; and
 identifying at least a particular coupon of the plurality of coupons in the database based on a particular search term within the determined category, the particular search term being a term other than the one or more input search terms.

13. The computer-readable storage medium of claim 11 further comprising instructions which, when executed by the one or more computing devices, further cause performing:
 determining a category for one of the selected one or more coupons; and
 identifying at least a particular coupon of the plurality of coupons in the database based on a particular search term within the determined category, wherein the particular search term is a term other than the one or more input search terms.

14. The computer-readable storage medium of claim 11, further comprising instructions which, when executed by the one or more computing devices, further cause performing: returning, in response to receiving the one or more input search terms, one or more coupons at random from the database.

15. The computer-readable storage medium of claim 11, wherein returning the filtered set of one or more coupons comprises returning a reference to an online location where the selected one or more coupons can be printed or redeemed.

16. The computer-readable storage medium of claim 11, wherein receiving the one or more input search terms comprises deriving at least some of the one or more input search terms from content of a web page.

17. The computer-readable storage medium of claim 11, wherein the first criterion is the number of times the given coupon in the plurality of coupons has been previously printed.

18. The computer-readable storage medium of claim 11, wherein the first criterion is the number of times the given coupon in the plurality of coupons has been previously redeemed.

19. A method comprising:
 receiving a request for one or more coupons, the request including one or more search terms;
 in response to the request:
  based on the one or more search terms, retrieving a plurality of coupons from a database;
 prioritizing the plurality of coupons based at least partially upon one or more of a number of times a given coupon in the plurality of coupons has been previously both returned as a search result and printed in response to the one or more search terms; a number of times the given coupon in the plurality of coupons has been previously both returned as a search result and redeemed in response to the one or more search terms; a number of times the given coupon in the plurality of coupons has been previously both returned as a search result and selected for viewing in response to the one or more search terms; or a number of times the given coupon in the plurality of coupons is to be printed for a campaign;
 based at least on the prioritizing, filtering the plurality of coupons to select which coupons in the plurality of coupons to return as one or more search results for the one or more search terms;
 wherein the filtering produces a filtered set of coupons comprising coupons selected as a result of the filtering, wherein the filtered set of one or more coupons is smaller than the plurality of coupons retrieved from the database;
 organizing the filtered set of one or more coupons based on priorities assigned during the prioritizing;
 returning, as the one or more search results for the one or more search terms, only the filtered set of one or more coupons;
 wherein the method is performed by one or more computing devices.

20. The method of claim 19, wherein the prioritizing is based at least partially upon the number of times the given coupon in the plurality of coupons has been previously printed.

21. The method of claim 19, wherein the prioritizing is based at least partially upon a number of times the given coupon in the plurality of coupons has been previously redeemed.

22. The method of claim 19, wherein the prioritizing of the plurality of coupons is based at least partially upon a number of times the given coupon in the plurality of coupons is to be printed for a campaign.

* * * * *